United States Patent
Lin (10) Patent No.: US 9,794,580 B2
(45) Date of Patent: Oct. 17, 2017

(54) CACHE MANAGEMENT DEVICE, AND MOTION PICTURE SYSTEM AND METHOD USING THE SAME

(71) Applicant: MStar Semiconductor, Inc., Hsinchu Hsien (TW)

(72) Inventor: He-Yuan Lin, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 393 days.

(21) Appl. No.: 14/548,471

(22) Filed: Nov. 20, 2014

(65) Prior Publication Data

US 2015/0139326 A1    May 21, 2015

(30) Foreign Application Priority Data

Nov. 21, 2013   (TW) .............................. 102142447 A (51) Int. Cl.
| | | |
|---|---|---|
| *H04N 7/12* | (2006.01) | |
| *G06F 13/00* | (2006.01) | |
| *H04N 19/433* | (2014.01) | |
| *H04N 19/513* | (2014.01) | |
| *H04N 19/573* | (2014.01) | |

(52) U.S. Cl.
CPC ......... *H04N 19/433* (2014.11); *H04N 19/521* (2014.11); *H04N 19/573* (2014.11)

(58) Field of Classification Search
CPC ... H04N 19/433; H04N 19/573; H04N 19/521
See application file for complete search history.

(56) References Cited

U.S. PATENT DOCUMENTS

| | | | |
|---|---|---|---|
| 6,924,811 B1* | 8/2005 | Minkin | G06T 1/60 345/552 |
| 2007/0064006 A1* | 3/2007 | Saxena | G09G 5/39 345/557 |
| 2010/0153645 A1* | 6/2010 | Kim | G06F 12/0875 711/118 |
| 2012/0233405 A1* | 9/2012 | Budagavi | G06F 12/0844 711/118 |

* cited by examiner

*Primary Examiner* — Tsion B Owens
(74) *Attorney, Agent, or Firm* — Edell, Shapiro & Finnan, LLC (57) ABSTRACT

A signal processing system for motion pictures includes a signal processing module, a cache, an analysis module and a control module. The signal processing module performs a signal processing process on motion picture data. The cache temporarily stores a set of reference data that is required for processing the motion picture during the signal processing process. The analysis module generates cache miss analysis information associated with the signal processing process and the cache. The control module determines an index content configuration of the cache according to the cache miss analysis information.

14 Claims, 5 Drawing Sheets

| correctness | tag | | | index | | offset |
|---|---|---|---|---|---|---|
| 0/1 | t[5:0] | y[11:6] | x[11:7] | y[5:0] | x[6:5] | x[4:0] |

FIG. 1(prior art)

(N-2)$^{th}$ picture     (N-1)$^{th}$ picture     N$^{th}$ picture

| correctness | tag | | index | | offset |
|---|---|---|---|---|---|
| 0/1 | y[11:6] | x[11:7] | y[5:0] | x[6:5] | x[4:0] |

FIG. 4(A)

| correctness | tag | | index | | offset |
|---|---|---|---|---|---|
| 0/1 | y[11:7] | x[11:6] | y[6:0] | x[5] | x[4:0] |

| correctness | tag | | | index | | offset |
|---|---|---|---|---|---|---|
| 0/1 | t[5:0] | y[11:6] | x[11:7] | y[5:0] | x[6:5] | x[4:0] |

FIG. 6(A)

| correctness | tag | | | index | | | offset |
|---|---|---|---|---|---|---|---|
| 0/1 | t[5:1] | y[11:5] | x[11:7] | t[0] | y[4:0] | x[6:5] | x[4:0] |

CACHE MANAGEMENT DEVICE, AND MOTION PICTURE SYSTEM AND METHOD USING THE SAME

This application claims the benefit of Taiwan application Serial No. 102142447, filed Nov. 21, 2013, the subject matter of which is incorporated herein by reference.

BACKGROUND OF THE INVENTION

Field of the Invention

The invention relates in general to a cache management technology, and more particularly, to a management technology for reducing cache misses.

Description of the Related Art

In a computer system, a cache is utilized for temporarily storing a small amount of data that has been recently used or may be later used. Compared to a main memory having a larger capacity, the cache has a faster data access speed and however a higher cost. In general, a main memory is implemented by a dynamic random access memory (DRAM), and a cache is implemented by a static random access memory (SRAM). When a certain set of data is required, a processor first looks for the data from the cache, and only turns to search for the data from the main memory if the data is not found in the cache.

Figure 1:
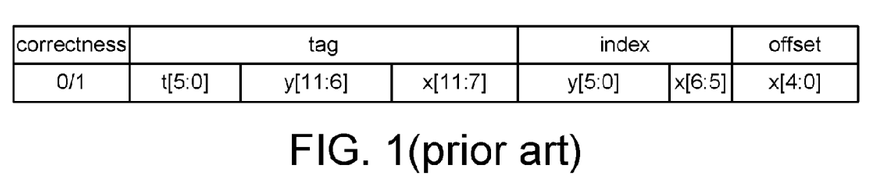
FIG. 1 shows an example of contents of three fields of tag, index and offset by taking a cache that store video data as an example.

A cache includes multiple cache lines for storing data contents captured from a main memory. Each cache line has a tag, an index and an offset. For the data stored in the cache lines, addresses of the data originally stored in the main memory are distributed and stored in the three fields of tag, index and offset. Taking video data stored in a cached for example, FIG. 1 shows contents of the three fields above. In this example, each of the cache lines stores an image block. An address of each block includes coordinates of a start position with respect to horizontal and vertical directions. These coordinates are represented in 12 binary bits, as $x[11:0]$ and $y[11:0]$. Further, the field of the offset includes 5 bits ($x[4:0]$), indicating that each cache line is capable of storing image data of 32 ($=2^5$) of a same horizontal line located in a picture. For example, assuming image data of one single pixel is 8 bits and the field of the offset includes 5 bits, the capacity of each cache line is then 256 ($=8*32$) bits.

As seen from FIG. 1, the coordinate $x[11:0]$ of the horizontal start position is divided into three parts—$x[11:7]$, $x[6:5]$ and $x[4:0]$, which are stored into the three fields of tag, index and offset, respectively. $x[11:7]$ represent five most significant bits of the coordinate $x[11:0]$, $x[4:0]$ represent five least significant bits of the coordinate $x[11:0]$, and $x[6:5]$ represent the two remaining middle bits of the coordinate $x[11:0]$. Further, the coordinate $y[11:0]$ of the vertical start position is divided into two parts—$y[11:6]$ and $y[5:0]$, which are stored into the two fields of tag and index, respectively. As shown in FIG. 1, the field of tag in this example further stores a time coordinate indicating a time sequence of the picture that includes a particular image block. The time coordinate is indicated by six binary bits as $t[5:0]$. Combining the contents of the three fields of tag, index and offset, the processor is able to obtain complete address information of the image block.

The size of a cache is usually quite limited, and cannot accommodate all image blocks of one picture. Taking a direct mapped cache for example, image blocks having the same contents in the field of index are stored into a same cache line when the image blocks are captured from the main memory to the cache. For the example in FIG. 1, the field of index includes eight bits, which represent 256 ($=2^8$) possibilities (00000000~11111111), indicating that the cache includes a total of 256 cache lines. For example, for the two image blocks A and B, given the eight bits of $y[5:0]$ and $x[6:5]$ are 00101100, even when other parts (x, y, and t) of the addresses of the two image blocks A and B are different, these two image blocks A and B will be set to be stored into the cache line with an index 00101100. In practice, if the image block A is previously stored in that cache line, the processor will overwrite the data of the image block A when writing the image block B into that cache line.

The contents in the field tag of a same cache line are different at the time points at which the image block A and the image block B are stored into that cache. To search for a set of target data from a cache, the processor first identifies the corresponding cache line according to the index, and determines whether the contents in a field representing the correctness indicates that the contents of the cache line are correct. The processor then determines whether the contents in the field of tag match the address of the target data. Only when the tag and the index both match, a cache hit is achieved, or else a cache miss has occurred. In the event of a cache miss, the processor needs to capture the target data from the main memory instead, and stores the target data to the corresponding cache line for subsequent uses.

In a motion picture decoding system, a cache is often utilized for temporarily storing a reference picture that is required for a motion compensation process. Motion compensation is a technology extensively applied in the field of motion image compression. A picture to be decoded is divided into multiple same-sized image blocks (e.g., 16*16 pixels). For each of the image blocks, an encoder identifies a most similar reference region from the reference picture, and determines a motion vector between an image block and the corresponding reference region. Apart from the motion vector, the encoder further determines an image content difference between an image block and the corresponding reference region. Such image content difference is referred to as a residual. An encoded image is represented by the motion vector and the residual. Correspondingly, the motion compensation process at a decoder needs to reconstruct complete contents of individual image blocks according to the motion vector, the residual and the reference picture.

Figure 2:
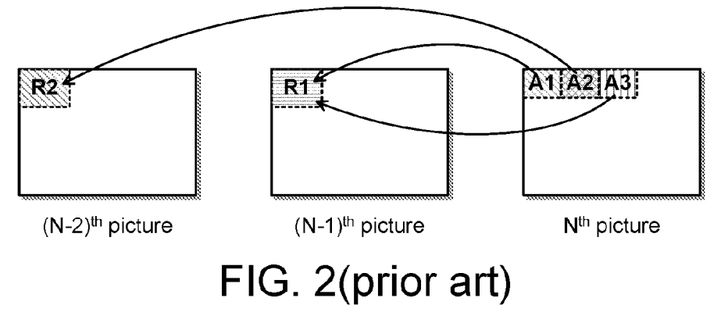
FIG. 2 is an exemplary corresponding relationship of multiple reference pictures.

To further enhance compression efficiency, a motion compensation process that involves multiple reference pictures is being adopted by many motion compensation standards in the recent years. That is, an encoder is allowed to identify an optimal motion vector and residual from multiple reference pictures (e.g., five preceding picture and five subsequent pictures of a current picture containing the image block). Thus, when decoding different image blocks of a same picture, the processor may need to capture the contents of multiple reference pictures from a main memory to a cache. FIG. 2 shows an example of a corresponding relationship of multiple pictures. The $N^{th}$, $(N-1)^{th}$ and $(N-2)^{th}$ pictures are temporally adjacent motion pictures. Assume that an image block A1 in the $N^{th}$ picture is encoded on the basis of a reference block R1 in the $(N-1)^{th}$ picture, and an image block A2 in the $N^{th}$ picture is encoded on the basis of a reference block R2 in the $(N-2)^{th}$ picture. The processor first captures the reference block R1 to the cache in the decoding process of the image block A1, and then captures the reference block R2 to the cache in the decoding process of the image block A2.

It is seen from FIG. 2 that, although having different time coordinates, the start position coordinates of the reference block R1 in the $(N-1)^{th}$ picture are identical to the start position coordinates of the reference block R2 in the $(N-2)^{th}$ picture. According to a current cache mapping configuration (e.g., the cache mapping configuration shown in FIG. 1), the reference blocks R1 and R2 are set to be stored into the same cache line. With one or multiple cache lines storing the reference block R1, the processor that fails to find the reference block R2 from the cache determines the occurrence of a cache miss. Thus, the processor captures the reference block R2 from the main memory to the cache, and overwrites the reference block R1 originally stored in the one or multiple cache lines. If another image block (e.g., A3) in the $N^{th}$ picture is subsequently encoded also on the basis of the reference block R1 in the $(N-1)^{th}$ picture, a cache miss is again incurred, such that the processor at the decoder needs to again capture the reference block R1 from the main memory to the cache and overwrites the reference block R2.

Generally known to one person skilled in the art, system overall performance degrades as the rate of cache miss gets higher. Proven by simulation experiments, a high cache miss rate is often caused during a motion compensation process based on multiple reference pictures at the decoder when a current cache mapping configuration is adopted.

SUMMARY OF THE INVENTION

The invention is directed to a cache management concept, and a signal processing system and a signal process method applying the cache management concept. By finding a root cause of cache misses and accordingly adaptively and appropriately adjusting an index content configuration of a cache, the cache management device, signal processing system and signal processing method of the present invention are capable of reducing the rate of cache miss. In addition to a decoder that performs motion compensation based on multiple reference pictures, the concept of the present invention is also applicable to various signal processing systems and signal processing methods that require a cache for temporarily storing data.

According to an embodiment of the present invention, a signal processing method for motion pictures is provided. The signal processing system includes a signal processing module, a cache, an analysis module and a control module. The signal processing module performs a signal processing process on motion picture data. The cache temporarily stores a set of reference data that is required for processing the motion picture data during the signal processing process. The analysis module generates cache miss analysis information associated with a result of the signal processing process and the cache. The control module determines an index content configuration according to the cache miss analysis information.

According to another embodiment of the present invention, a signal processing method is provided. The signal processing method includes: performing a signal processing process on motion picture data, the processing process utilizing a cache to temporarily store a set of reference data that required for processing the motion picture data; performing an analysis process to generate cache miss analysis information associated with a result of the signal processing process and the cache; and determining an index content configuration of the cache according to the cache miss analysis information.

According to another embodiment of the present invention, a cache management device is provided. The cache management device includes an analysis module and a control module. A cache temporarily stores a set of reference data that is required for processing data. The analysis module generates cache miss analysis information associated with the cache when the data is processed. The control module determines an index content configuration of the cache according to the cache miss analysis information.

The above and other aspects of the invention will become better understood with regard to the following detailed description of the preferred but non-limiting embodiments. The following description is made with reference to the accompanying drawings.

DETAILED DESCRIPTION OF THE INVENTION

In the disclosure, the term "present invention" refers to inventive concepts described by the non-limiting embodiments below.

Figure 3A:
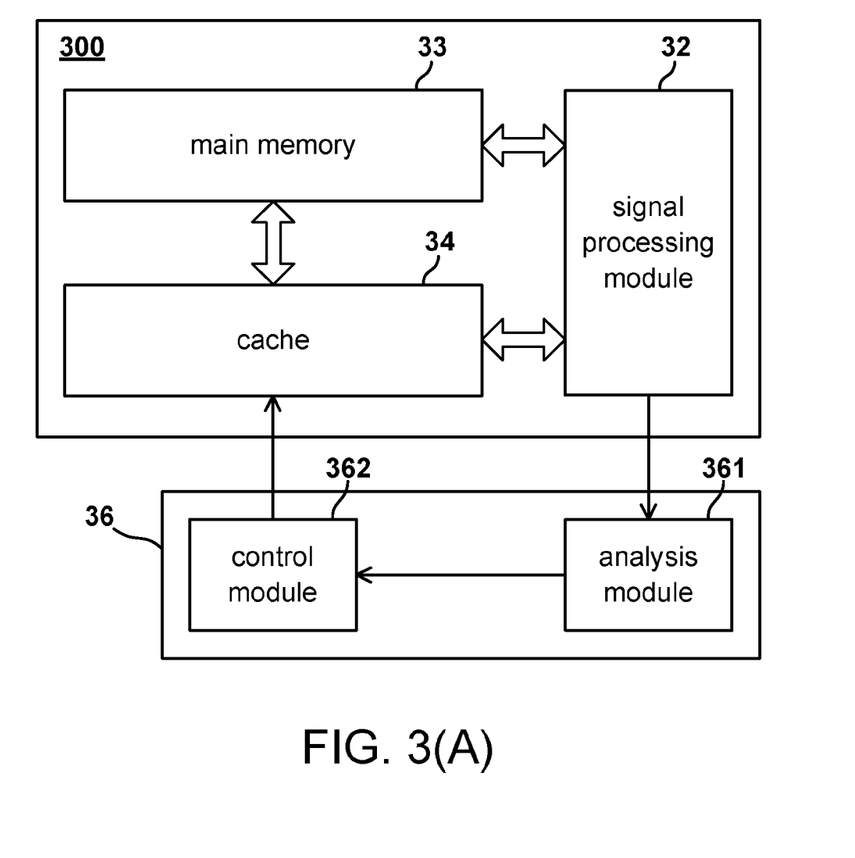
FIG. 3(A) is a block diagram of a signal processing system and a cache management device according to an embodiment of the present invention.

A cache management device is provided according to an embodiment of the present invention. A cache collaborating with the cache management device stores reference data that is required for processing data. The cache management device includes an analysis module and a control module. The analysis module generates cache miss analysis information associated with the cache when the data is processed. The control module determines an index content configuration of the cache according to the cache miss analysis information. FIG. 3(A) shows a block diagram of an application example of the cache management device.

In the example in FIG. 3(A), a cache management device 36 includes an analysis module 361 and a control module 352, and is for managing a cache 34 included in a signal processing system 300. In addition to the cache 34, the signal processing system 300 further includes a signal processing module 32 and a main memory 33. In practice, the signal processing system 300 and the cache management device 36 may be integrated in various kinds of electronic apparatuses (e.g., mobile phones, computers, televisions and set-up boxes), or may be independent units.

The signal processing module 32 performs a signal processing process on motion picture data, e.g., performing a motion compensation process on an image block of a motion picture to be encoded. In the description below, the signal processing process is exemplified by a motion compensation process performed at a decoder during image reconstruction at a decoder. It should be noted that, details of the motion compensation process (e.g., reconstructing a complete image block according to a motion vector, a residual and a reference picture) are generally known to one person skilled in the art, and shall be omitted herein.

In the motion compensation process, the cache 34 temporarily stores an associated reference picture (e.g., the reference blocks R1 and R2 in FIG. 2) for image block reconstruction. That is, the reference picture is the basis for accordingly generating the motion vector and the residual. When the signal processing module 32 cannot find the required reference picture from the cache 34, i.e., in the event of a so-called cache miss, the signal processing module 32 then needs to look for the reference picture from the main memory 33. A complete picture usually includes multiple image blocks. During a motion compensation process for reconstructing a picture, the occurrence of cache misses is inevitable. The analysis module 361 generates cache miss analysis information associated with a result of the motion compensation process and the cache 34. The control module 362 then determines an index content configuration of the cache 34 according to the cache miss analysis information.

Figure 3B:
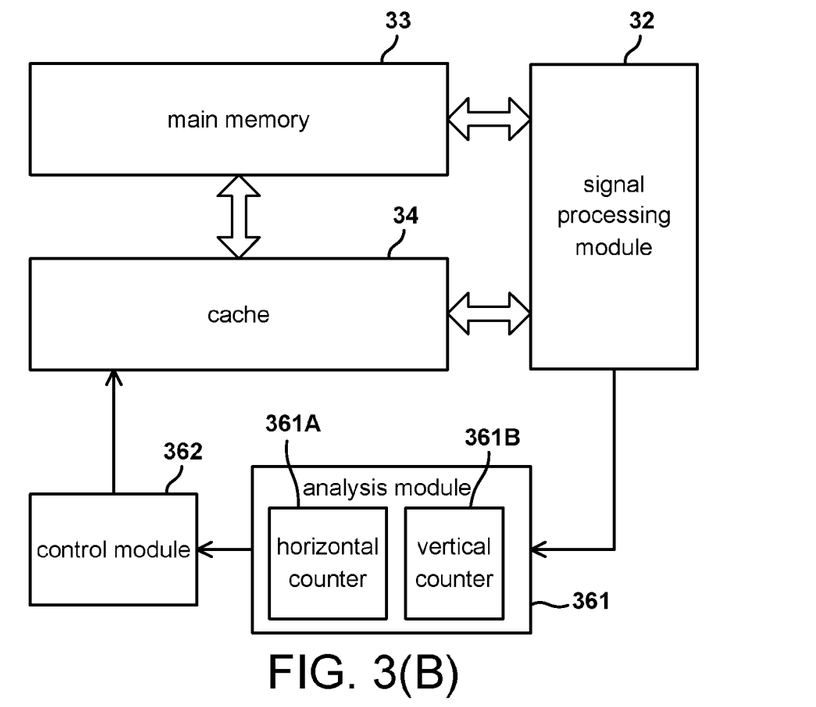
FIG. 3(B) is a detailed example of an analysis module according to an embodiment of the present invention.

FIG. 3(B) shows a detailed example of the analysis module 361. In this example, the analysis module 361 performs a statistical procedure for the cache misses occurred during the motion compensation process. The result of the motion compensation process refers to the cache misses. Assuming that the motion compensation process performed by the signal process module 32 is a motion compensation process based on one single reference picture, possible cache misses may be classified into two main categories—horizontal dislocation misses and vertical dislocation misses. To search for a set of target data from the cache 34, the signal processing module 32 may first identify a corresponding cache line according to the index, and determine whether the correctness field indicates that content data of the cache line is correct. Then, the signal processing module 32 is also required to determine whether contents in the field of tag match with the address of the target data. When the signal processing module 32 figures out the index is matching but the tag is mismatching, the analysis module 361 may determine the category of this cache miss according to a difference between the contents of the target tag (i.e., address of the tag field of the target image block being searched) and the contents of the tag of the present cache line. For example, when contents corresponding to the vertical coordinate y in the two tags are identical and contents corresponding to the horizontal coordinate x are different, the analysis module 361 may determine that this cache miss is a horizontal dislocation miss. Similarly, when contents corresponding to the horizontal coordinate x in the two tags are identical and contents corresponding to the vertical coordinate y are different, the analysis module 361 may determine that this cache miss is a vertical dislocation miss.

A horizontal counter 361A accumulates the number of times of horizontal dislocation misses occurred during the motion compensation process for one or multiple pictures. A vertical counter 361B accumulates the number of times of vertical dislocation misses occurred during the motion compensation process of the same period. In practice, one cache miss may simultaneously be both a horizontal dislocation miss and a vertical dislocation miss. A designer of the analysis module 361 may determine how to classify such type of cache miss. For example, a cache miss having a level of horizontal dislocation higher than a level of vertical dislocation may be classified as a horizontal dislocation miss. Alternatively, according to ratios of horizontal dislocation and vertical dislocation, the two counter values may be added by a non-integer. After accumulating the counter results for a period of time, the analysis module 361 may determine which category of cache misses have occurred for a greater number of times, and provide such information as the cache miss analysis information to the control module 362.

Figure 4A:
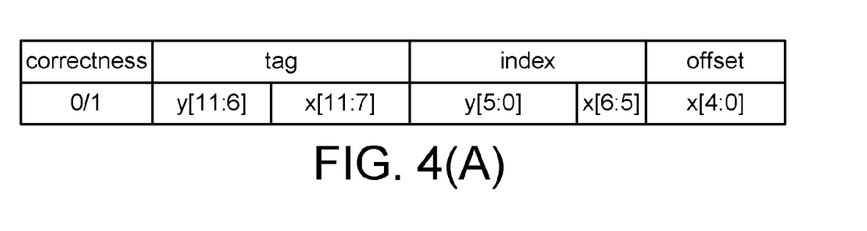
FIG. 4(A) and FIG. 4(B) are an example of changing a tag/index content configuration.
Figure 4B:
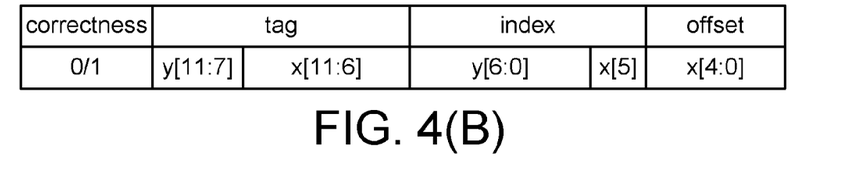

Assume that the original tag/index content configuration of the cache 34 is shown as FIG. 4(A). If the vertical dislocation misses have occurred for a greater number of times, the control module 352 may decrease the bit count of the horizontal coordinate in the index field (e.g., reducing the original two-bit x[6:5] to one-bit x[5]), and increase the bit count of the vertical coordinate in the index field (e.g., increasing the original six-bit y[5:0] to seven-bit y[6:0]). FIG. 4(B) shows an example of a changed tag/index content configuration. As shown in FIG. 4(B), the distribution of the tag field also correspondingly changes—the horizontal coordinate is adjusted from the original five-bit x[11:7] to six-bit x[11:6], and the vertical coordinate is adjusted from the original six-bit x[11:6] to five-bit x[11:7]. Comparing FIG. 4(A) and FIG. 4(B), in this example, the total bit count of the contents in the tag field, the total bit count of the contents in the index field, and the total bit count of the address of the image block are constant. Compared to the tag/index content configuration in FIG. 4(A), the tag/index content configuration in FIG. 4(B) allows the cache 34 to accommodate more reference data having the same horizontal coordinate but different vertical coordinates in the same period, thereby reducing the probability of vertical dislocation misses. In contrast, when there are a greater number of horizontal dislocation misses, the control module 362 may decrease the bit count of the vertical coordinate in the index field and increase the bit count of the horizontal coordinate in the index field. In one embodiment, when current cache miss information indicates that the category of cache misses occurred for a greater number of times is different from that indicated in a previous set of cache miss analysis information, the control module 362 may correspondingly change the index content configuration of the cache 34.

Figure 5:
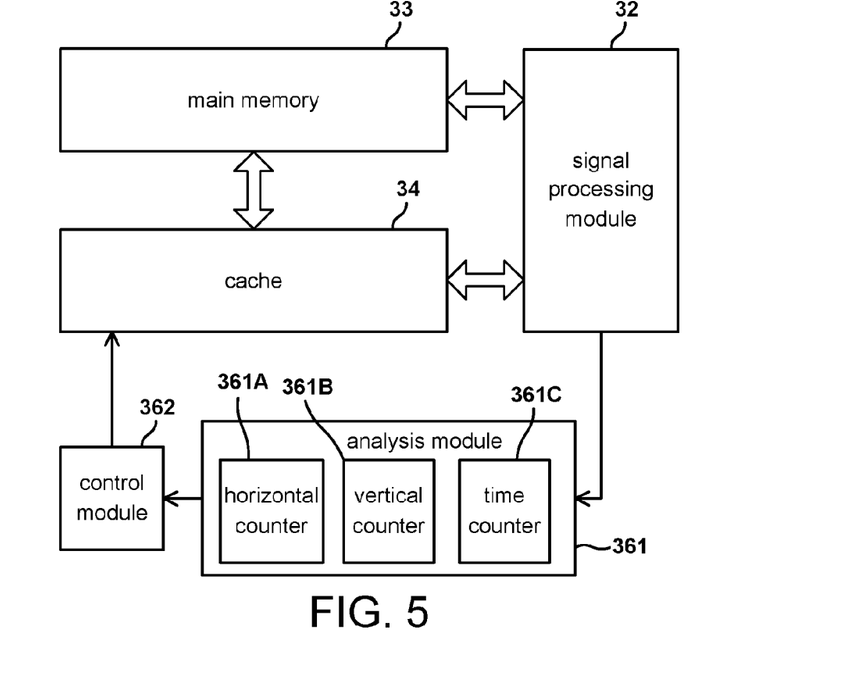
FIG. 5 is another detailed example of an analysis module according to an embodiment of the present invention.
Figure 6A:
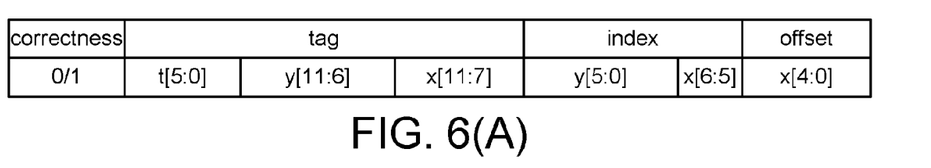
FIG. 6(A) and FIG. 6(B) are another example of changing a tag/index content configuration.
Figure 6B:
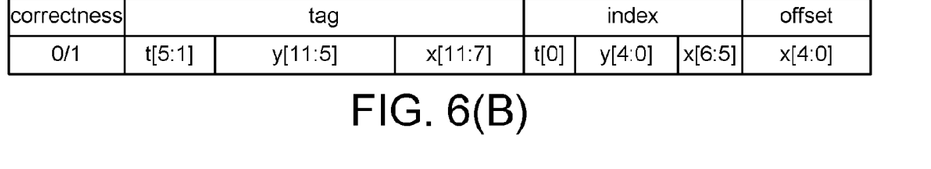

On the other hand, when the motion compensation process performed by the signal processing module 32 is based on multiple reference pictures, possible cache misses may be at least classified into horizontal dislocation misses, vertical dislocation misses and time dislocation misses. The time dislocation misses refer to a matching index with mismatching contents of time coordinates in the tag field. As shown in FIG. 5, in the above situation, the analysis module 361 may include three counters for respectively accumulating the three different categories of cache misses—the horizontal counter 361A, the vertical counter 361B and a time counter 361C. The horizontal counter 361A accumulates the number of times of horizontal dislocation misses occurred during the motion compensation process for one or multiple pictures. A vertical counter 361B accumulates the number of times of vertical dislocation misses occurred during the motion compensation process of the same period. The time counter 361C accumulates the number of times of time dislocation misses occurred during the motion compensation process of the same period. Assume that the index field of the cache 34 includes N-bit horizontal position information, R-bit vertical position information and P-bit time information, where N, R and P are natural numbers. The control module 362 changes at least two of N, R and P according to the cache miss analysis information provided by the analysis module 36, and keeps a total of N, R and P unchanged. Assume that the original tag/index content configuration of the cache 34 is as shown in FIG. 6(A). If the time dislocation misses have occurred for a greater number of times, the control module 36 may decrease the bit count of the time coordinate in the tag field and increase the bit count of the time coordinate in the index field, so as to allow the cache 34 to accommodate reference data having different time coordinates over a same period of time. FIG. 6(B) shows an example of a changed tag/index content configuration. Under such circumstances, the cache 34 may simultaneously accommodate two sets of reference data having different time coordinates.

In practice, the analysis module 361 and the control module 362 may iterate respective operations of analyzing and selectively adjusting the cache configuration. For example, each time when the signal processing module 32 completes the signal processing process for one complete picture, the analysis module 361 and the control module 362 again evaluate whether to change the index content configuration of the cache 34.

A direct mapped cache is taken as an example in the above embodiments. One person skilled in the related art can understand that, the concept of the present invention may be extended to an M-way cache (where M is a positive integer greater than 1). For example, the control module according to the present invention may simultaneously change the tag/index content configurations of the M sets of caches. Further, one person skilled in the art can also appreciate that the application scope of the cache management device 36 is not limited to the above situation involving motion compensation.

Figure 7:
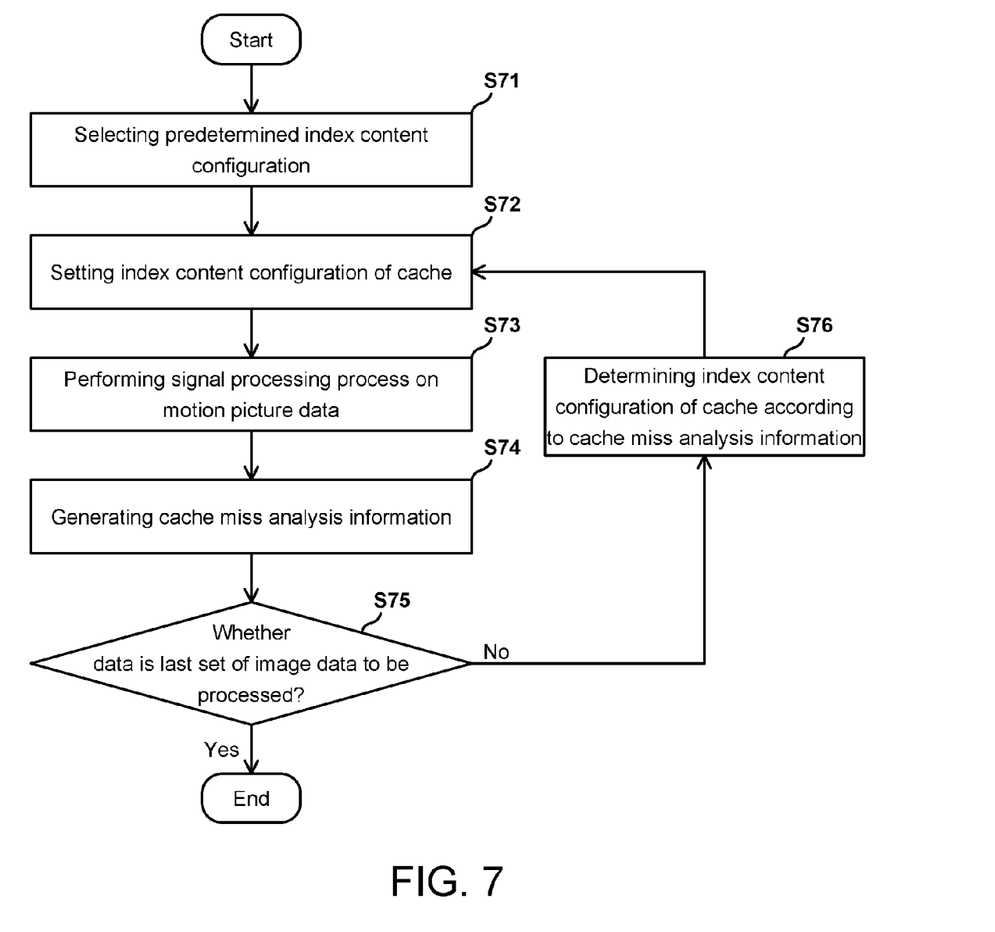
FIG. 7 is a flowchart of a signal processing method according to an embodiment of the present invention.

FIG. 7 shows a flowchart of a signal processing method for motion pictures according to another embodiment of the present invention. In step S71, a predetermined index content configuration of a cache is selected. In step S72, the cache is configured according to the latest selected index content configuration. In step S73, a signal processing process is performed on motion picture data. The signal processing process utilizes the cache to store reference data that is required for processing the motion picture data. In step S74, cache miss analysis information associated with a result of the signal processing process and the cache is generated. In step S75, it is determined whether data received and processed in step S73 is a last set of motion picture data to be processed. The process ends when a determination result of step S75 is affirmative, or else step S76 is performed when the determination result of step S75 is negative. In step S76, the index content configuration of the cache is determined according to the cache miss analysis information. Step S72 to step S75 are then iterated. Operation details and variations in the description associated with the signal processing system 300 and the cache management device 36 (e.g., approaches for changing the index content configuration of the cache) are applicable to the signal processing method in FIG. 7, and shall be omitted herein.

A cache management concept, and a signal processing and a signal processing method applying the cache management concept of the present invention are as disclosed. By finding a root cause of cache misses and accordingly adaptively and appropriately adjusting an index content configuration of a cache, the management device, signal processing system and signal processing method of the present invention are capable of reducing the rate of cache miss. In addition to a decoder that performs motion compensation based on multiple reference pictures, the concept of the present invention is also applicable to various signal processing systems and signal processing methods that require a cache for temporarily storing data.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal processing system for motion pictures, comprising: a signal processing module, configured to perform a signal processing process on motion picture data; a cache, configured to temporarily store a set of reference data that is required for processing the motion picture data; an analysis module, configured to generate cache miss analysis information associated with the cache and a result of the signal processing process; and a control module, configured to determine an index content configuration according to the cache miss analysis information, wherein the analysis module performs a statistical procedure for a plurality of cache misses occurred during the signal processing process, the result of the signal processing process being the cache misses, the cache miss analysis information indicating a category of the cache misses that have occurred for a greatest number of times during the signal processing process is one of a horizontal dislocation miss, a vertical dislocation miss and a time dislocation miss; when the category of cache misses occurred for the greatest number of times is different from that indicated in a previous set of cache miss analysis information, the control module changes the index content configuration of the cache.

2. The signal processing system according to claim 1, wherein the signal processing process comprises a motion compensation process performed at a decoder during picture reconstruction.

3. The signal processing system according to claim 2, wherein the motion compensation process is a motion compensation process based on multiple reference pictures.

4. The signal processing system according to claim 1, wherein an index content of the cache comprises horizontal position information, vertical position information and time information of the motion picture data; the horizontal position information comprises N bits, the vertical position information comprise R bits, and the time information comprises P bits, where N, R and P are natural numbers; the control module changes the index content configuration by changing values of at least two of N, R and P.

5. The signal processing system according to claim 1, wherein after the signal processing module performs the signal processing process on another set of motion picture data, the analysis module and the control module again evaluate whether to change the index content configuration of the cache.

6. The signal processing system according to claim 1, wherein the cache is an M-way cache, where M is a positive integer.

7. A signal processing method for motion pictures, comprising: a) performing a signal processing process on motion picture data, the signal processing process utilizing a cache to temporarily store a set of reference data that is required for processing the motion picture data; b) generating cache miss analysis information associated with the cache and a result of the signal processing process; and c) determining an index content configuration according to the cache miss analysis information, wherein step (b) comprises: performing a statistical procedure for a plurality of cache misses occurred during the signal processing process, the result of the signal processing process being the cache misses, the cache miss analysis information indicating a category of the cache misses that have occurred for a greatest number of times during the signal processing process is one of a horizontal dislocation miss, a vertical dislocation miss and a time dislocation miss; and step (c) comprises: when the category of cache misses occurred for the greatest number of times is different from that indicated in a previous set of cache miss analysis information, changing the index content configuration of the cache.

8. The signal processing method according to claim 7, wherein signal processing process comprises a motion compensation process performed at a decoder during picture reconstruction.

9. The signal processing method according to claim 8, wherein the motion compensation process is a motion compensation process based on multiple reference pictures.

10. The signal processing method according to claim 7, wherein an index content of the cache comprises horizontal position information, vertical position information and time information of the motion picture data; the horizontal position information comprises N bits, the vertical position information comprise R bits, and the time information comprises P bits, where N, R and P are natural numbers; the control module changes the index content configuration by changing values of at least two of N, R and P.

11. The signal processing method according to claim 7, wherein step (a) to step (c) are iterated for another set of motion picture data to adaptively adjust the index content configuration of the cache.

12. The signal processing method according to claim 7, wherein the cache is an M-way cache, where M is a positive integer.

13. A cache management device, a cache for temporarily storing reference data that is required for processing a set of data, the cache management device comprising: an analysis module, configured to generate cache miss analysis information associated with a result of the signal processing process and the cache; and a control module, configured to determine an index content configuration according to the cache miss analysis information, wherein the analysis module performs a statistical procedure for a plurality of cache misses occurred during the signal processing process, the result of the signal processing process being the cache misses, the cache miss analysis information indicating a category of cache misses that have occurred for a greatest number of times during the signal processing process, and the category is one of a horizontal dislocation miss, a vertical dislocation miss and a time dislocation miss.

14. The cache management device according to claim 13, wherein the set of data is a set of motion picture data, and the reference data temporarily stored in the cache is utilized by a decoder to perform a motion compensation process on the motion picture data.

* * * * *